US012541171B2

(12) United States Patent
Takayama et al.

(10) Patent No.: US 12,541,171 B2
(45) Date of Patent: Feb. 3, 2026

(54) TONER SUPPLY ROLLER, DEVELOPING APPARATUS, ELECTROPHOTOGRAPHIC IMAGE FORMING APPARATUS AND PROCESS CARTRIDGE

(71) Applicant: CANON KABUSHIKI KAISHA, Tokyo (JP)

(72) Inventors: Ryosuke Takayama, Shizuoka (JP); Hiroaki Komatsu, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/802,696

(22) Filed: Aug. 13, 2024

(65) Prior Publication Data

US 2025/0068122 A1 Feb. 27, 2025

(30) Foreign Application Priority Data

Aug. 23, 2023 (JP) ................................ 2023-135885

(51) Int. Cl.
*G03G 15/08* (2006.01)
*C08J 9/00* (2006.01)
*G03G 21/18* (2006.01)

(52) U.S. Cl.
CPC .......... *G03G 21/1814* (2013.01); *C08J 9/008* (2013.01); *G03G 15/0808* (2013.01); *G03G 21/1867* (2013.01); *C08J 2375/04* (2013.01)

(58) Field of Classification Search
None
See application file for complete search history.

(56) References Cited

U.S. PATENT DOCUMENTS

| | | | |
|---|---|---|---|
| 8,298,670 B2 | 10/2012 | Muranaka et al. | |
| 8,449,975 B2 | 5/2013 | Hirakoso et al. | |
| 9,023,465 B2 | 5/2015 | Yamada et al. | |
| 9,625,854 B2 | 4/2017 | Koyanagi et al. | |
| 9,811,021 B2 | 11/2017 | Muranaka et al. | |

(Continued)

FOREIGN PATENT DOCUMENTS

| | | | |
|---|---|---|---|
| CA | 3218892 A1 * | 11/2022 | ......... G03G 15/6594 |
| DE | 102012201352 A1 | 8/2012 | |

(Continued)

OTHER PUBLICATIONS

U.S. Appl. No. 18/802,667, Seiji Tsuru, filed Aug. 13, 2024.

*Primary Examiner* — Sevan A Aydin
(74) *Attorney, Agent, or Firm* — VENABLE LLP

(57) ABSTRACT

An electrophotographic roller includes: a conductive substrate; and a foamed layer on an outer circumferential surface of the substrate, in which the foamed layer is a surface layer of the electrophotographic roller, the foamed layer has a skeleton including a binder resin, and at least one conductive particle in the binder resin, the foamed layer has a communication structure having at least one gap opening, and extending in a thickness direction of the foamed layer, at least a portion of an inner wall of the gap includes the skeleton, at least a portion of the at least one conductive particle is exposed at the inner wall, a thickness of the foamed layer is 2.0 mm or more, and in the observation of the cross section of the foamed layer by a scanning electron microscope, the ratio of number of pixels of a specific brightness falls within a specific range.

11 Claims, 3 Drawing Sheets

(56) References Cited

U.S. PATENT DOCUMENTS

| | | | | |
|---|---|---|---|---|
| 10,635,019 | B2 | 4/2020 | Doi et al. | |
| 10,678,161 | B2 | 6/2020 | Tsuru et al. | |
| 10,884,352 | B2 | 1/2021 | Yamada et al. | |
| 10,969,709 | B2 | 4/2021 | Arimura et al. | |
| 10,996,581 | B2 | 5/2021 | Muranaka et al. | |
| 11,022,904 | B2 | 6/2021 | Arimura et al. | |
| 11,112,718 | B2 | 9/2021 | Uno et al. | |
| 11,169,464 | B2 | 11/2021 | Komatsu et al. | |
| 11,971,668 | B2 | 4/2024 | Takayama et al. | |
| 2001/0026708 | A1* | 10/2001 | Ishii | G03G 9/0823 399/222 |
| 2006/0142131 | A1 | 6/2006 | Iwamura et al. | |
| 2007/0230975 | A1 | 10/2007 | Yamazaki et al. | |
| 2011/0048324 | A1 | 3/2011 | Yamashita et al. | |
| 2012/0193583 | A1 | 8/2012 | Roetker et al. | |
| 2014/0064792 | A1* | 3/2014 | Kawamura | G03G 9/0821 399/286 |
| 2014/0199098 | A1 | 7/2014 | Abe et al. | |
| 2014/0295339 | A1* | 10/2014 | Kadokura | G03G 9/09392 430/108.4 |
| 2015/0153676 | A1* | 6/2015 | Masuyama | B29C 43/021 399/281 |
| 2017/0315469 | A1* | 11/2017 | Ishii | G03G 15/0808 |
| 2020/0041921 | A1* | 2/2020 | Yamaguchi | G03G 15/0818 |

FOREIGN PATENT DOCUMENTS

| | | | |
|---|---|---|---|
| DE | 102011081113 | B3 | 1/2013 |
| JP | 2004-101958 | A | 4/2004 |
| JP | 2009-139866 | A | 6/2009 |

* cited by examiner

FIG. 4A
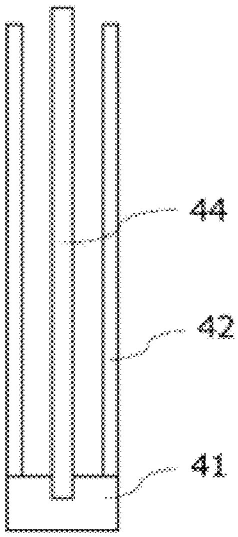
FIG. 4B
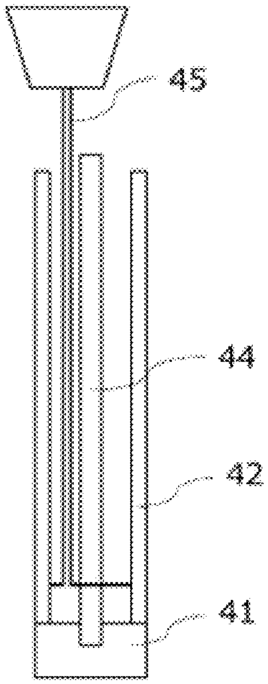
FIG. 4C
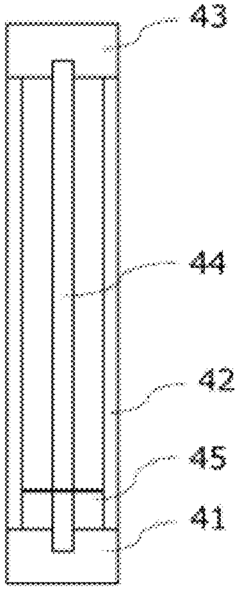
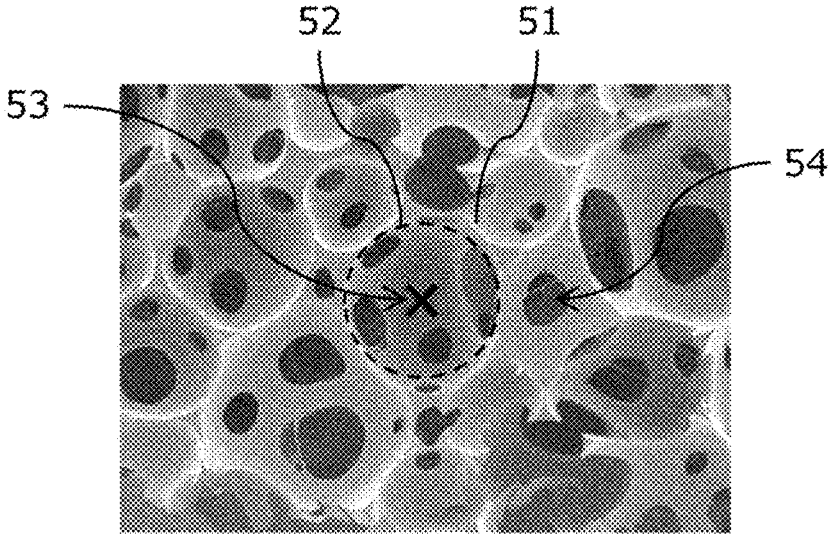
FIG. 5

FIG. 6A
SURROUNDED OPENING
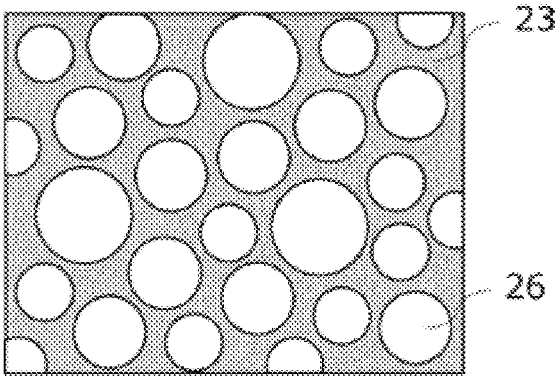
FIG. 6B
OPENING NOT SURROUNED
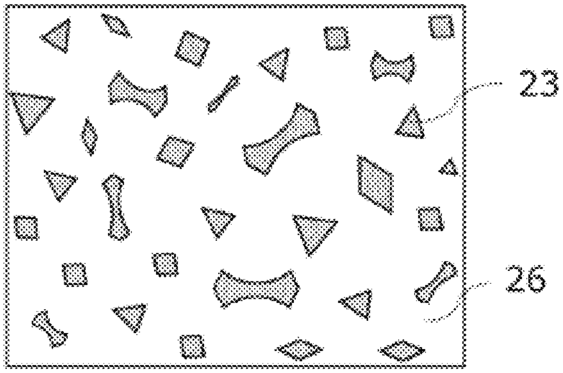
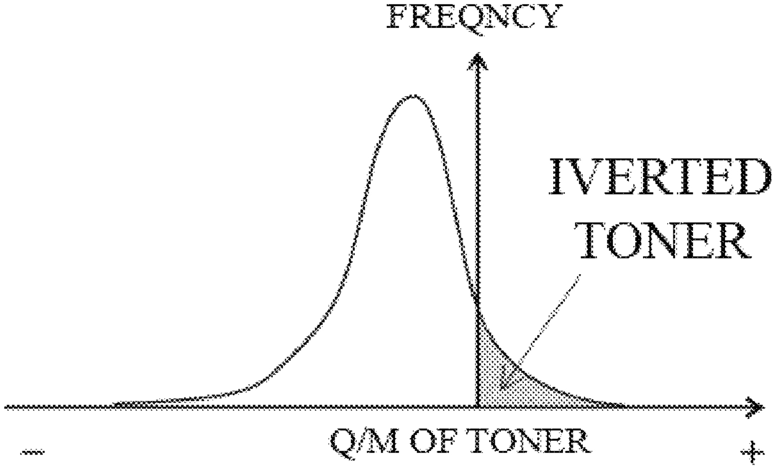
FIG. 7

TONER SUPPLY ROLLER, DEVELOPING APPARATUS, ELECTROPHOTOGRAPHIC IMAGE FORMING APPARATUS AND PROCESS CARTRIDGE

BACKGROUND OF THE INVENTION

Field of the Invention

The present disclosure relates to an electrophotographic roller, a developing apparatus, and a process cartridge for use in an electrophotographic image forming apparatus. Further, the present disclosure relates to an electrophotographic image forming apparatus.

Description of the Related Art

In an electrophotographic image forming apparatus (a copier, a facsimile, a printer, or the like using an electrophotographic system, which will be hereinafter also referred to as an "image forming apparatus"), an electrophotographic photosensitive member (which will be hereinafter also referred to as a "photosensitive member") is charged by a charging roller, and is exposed to light. As a result, an electrostatic latent image is formed on the photosensitive member. Then, a toner in the developer container is applied onto a development roller by a toner supply roller and a toner regulating member. Then, the development roller conveys the toner to a developing zone. With the toner conveyed to the developing zone, development of the electrostatic latent image on the photosensitive member is performed by the photosensitive member, and the development roller portion or a nearby portion of the development roller. Subsequently, the toner on the photosensitive member is transferred by a transfer means onto a recording paper sheet, and is fixed by a heat and a pressure. The toner left on the photosensitive member is removed by a cleaning blade.

In the electrophotographic image forming apparatus, for example, as the toner supply roller, an electrophotographic roller including a foamed elastic layer is used. Japanese Patent Application Publication No. 2009-139866 describes the invention relating to a conductive roller usable as a toner supply roller. The conductive roller includes a conductive polyurethane foam. The conductive polyurethane foam includes a substrate including a soft polyurethane foam, and a conductive coat layer. The substrate is formed of a skeleton and a cell film. The conductive coat layer is provided at at least a part of each surface of the skeleton and the cell film, and the conductive coat layer includes a carbon nanotube.

SUMMARY OF THE INVENTION

In the image forming process of an electrophotographic image forming apparatus, on a non-image formation portion (blank portion) of the photosensitive member, a toner that should not be deposited may be deposited. This phenomenon is referred to as "fog". When the "fog" is generated, the image quality is deteriorated, and an increase in toner consumption reduces the number of printable paper sheets in one toner cartridge. For this reason, the suppression of the "fog" is one of the problems to be solved for still further improving the image quality of the electrophotographic image, and reducing the exchange frequency of the cartridge.

Of the "fogs", the "fog" caused by the toner charged in the opposite polarity to the regular polarity (which will be hereinafter also referred to as an "inverted toner") is also referred to as an "inverted fog". The "inverted fog" is generated by attraction of the positively charged inverted toner to the photosensitive member with a more negative charging electric potential Vd than the development electric potential Vdc, for example, when the regular polarity of the toner is negative.

For still further improvement of the image quality of an electrophotographic image, and the enhancement of a user merit such as still further reduction of the cartridge exchange frequency, the present inventors have come to recognize that the technical development for achieving still further suppression of the "inverted fog" is necessary. Herein, the present inventors have findings that the charging state of the toner as a result of impartation of electric charges to the toner by the toner supply roller in the electrophotographic image forming apparatus largely affects the "inverted fog". Then, according to the study by the present inventors, with the electrophotographic image forming apparatus using a conductive roller for a toner supply roller in accordance with Japanese Patent Application Publication No. 2009-139866, the suppression of the inverted fog was still insufficient.

At least one aspect of the present disclosure is targeted for providing an electrophotographic roller capable of performing still further suppression of the inverted fog. Further, at least one aspect of the present disclosure is targeted for providing a developing apparatus contributing to the formation of a high quality electrophotographic image. Still further, at least one aspect of the present disclosure is targeted for providing an electrophotographic image forming apparatus capable of outputting a high quality electrophotographic image with stability. Furthermore, at least one aspect of the present disclosure is targeted for providing a process cartridge contributing to the formation of a high quality electrophotographic image.

At least one aspect of the present disclosure provides an electrophotographic roller comprising:

a conductive substrate; and a foamed layer on an outer circumferential surface of the substrate, wherein the foamed layer is a surface layer of the electrophotographic roller, the foamed layer has a skeleton including a binder resin, and at least one conductive particle in the binder resin, the foamed layer has a communication structure having at least one gap opening in an outer surface of the foamed layer, and extending in a thickness direction of the foamed layer, at least a portion of an inner wall of the gap is constituted of the skeleton, at least a portion of the at least one conductive particle is exposed at the inner wall, a thickness T of the foamed layer is 2.0 mm or more, with L being a length in the longitudinal direction of the foamed layer, at respective 4 sites rotated by 90 degrees in a circumferential direction of the foamed layer, at each of 3 sites of a midpoint in a longitudinal direction of the foamed layer, and points each at a distance of L/4 from each opposite end toward the midpoint, a cross section with a total thickness of the foamed layer—in a direction along a circumferential direction of the electrophotographic roller is exposed, for each of the cross sections at a total of 12 sites, the inner wall of the at least one gap present in a region to a depth of 1.0 mm from the outer surface of the foamed layer is observed by a scanning electron microscope, thereby acquiring a secondary electronic image at a magnification of 5000 times, and a resolution of 18 nm/pixel, having 256 gradation steps with the lowest gradation of 0 and the highest gradation of 255, having a contrast of 1200, and an average brightness of 128±16, and in a case where a ratio Rs of a total sum of a number of pixels belonging to brightness of 200 to 255 to a total number of pixels in the secondary electronic image is determined, an average value of Rs at the 12 sites is 0.5% or more, and, for each of the cross sections at the total of 12 sites, the inner wall of the at least one gap present in a region to a thickness of 1.0 mm from a surface on a side of the foamed layer opposed to the substrate toward the outer surface of the foamed layer is observed by a scanning electron microscope, thereby acquiring a secondary electronic image at a magnification of 5000 times, and a resolution of 18 nm/pixel, having 256 gradation steps with the lowest gradation of 0 and the highest gradation of 255, having a contrast of 1200, and an average brightness of 128±16, and in a case where a ratio Rt of a total sum of a number of pixels belonging to brightness of 200 to 255 to a total number of pixels in the secondary electronic image is determined, an average value of Rt at the 12 sites is 0.5% or more.

At least one aspect of the present disclosure provides a developing apparatus including at least a development roller, and a toner supply roller for supplying a toner to the development roller, configured such that a voltage can be applied between the development roller and the toner supply roller, in which the toner supply roller is the electrophotographic roller.

At least one aspect of the present disclosure provides an electrophotographic image forming apparatus including the developing apparatus.

At least one aspect of the present disclosure provides a process cartridge detachable with respect to the main body of an electrophotographic image forming apparatus, the process cartridge having a contact point member to be electrically connected with the electric contact of the main body when mounted on the main body, the process cartridge including a development roller and a toner supply roller for supplying a toner to the development roller, the process cartridge being configured such that a voltage can be applied between the development roller and the toner supply roller by an electric connection with the main body, and the toner supply roller being the electrophotographic roller.

At least one aspect of the present disclosure can provide an electrophotographic roller capable of achieving still further suppression of the inverted fog. Further, at least one aspect of the present disclosure can provide a developing apparatus contributing to the formation of a high quality electrophotographic image. Still further, at least one aspect of the present disclosure can provide an electrophotographic image forming apparatus capable of outputting a high quality electrophotographic image with stability. Furthermore, at least one aspect of the present disclosure can provide a process cartridge contributing to the formation of a high quality electrophotographic image.

Further features of the present invention will become apparent from the following description of exemplary embodiments with reference to the attached drawings.

BRIEF DESCRIPTION OF THE DRAWINGS

FIGS. 4A to 4C are each a schematic cross sectional view of a mold at the time of molding of an electrophotographic roller in accordance with one aspect of the present invention;

FIG. 5 is a SEM image of the foamed layer cut surface;

FIGS. 6A and 6B are each a schematic view of an opening of the foamed layer outermost surface upon observing the surface profile of the foamed layer; and FIG. 7 is a schematic view of the charging amount distribution of a toner.

DESCRIPTION OF THE EMBODIMENTS

Figure 1:
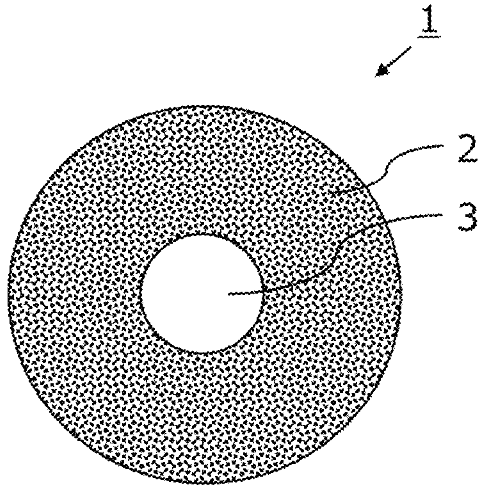
FIG. 1 is a schematic cross sectional view of an electrophotographic roller in accordance with one aspect of the present invention.

In the present disclosure, the expression "from XX to YY" or "XX to YY" indicating the numerical value range means the numerical value range including the lower limit and the upper limit of endpoints, unless otherwise specified. When the numerical value range is described in stages, the upper limit and the lower limit of each numerical value range can be arbitrarily combined. Further, in the present disclosure, for example, the description such as "at least one selected from the group consisting of XX, YY, and ZZ" means any of XX, YY, ZZ, the combination of XX and YY, the combination of XX and ZZ, the combination of YY and ZZ, or the combination of XX, YY, and ZZ.

The present inventors presume the reason why when the conductive roller in accordance with Japanese Patent Application Publication No. 2009-139866 was used as the toner supply roller, the inverted fog could not be sufficiently suppressed as follows. With the conductive roller in accordance with Japanese Patent Application Publication No. 2009-139866, the conductive coat layer provided at at least a part of the skeleton of the substrate including soft polyurethane foam and the cell film comes in contact with a toner, so that the toner is applied with electric charges. At this step, conceivably, most of the carbon nanotube, i.e., a conductive agent in the conductive coat layer is buried in the conductive coat layer. The electric charges applied to the toner that has come in contact with such a conductive coat layer is considered to be mainly caused by triboelectric charging. For this reason, the toner which has come in contact with the conductive coat layer is considered to also include a toner charged to the opposite polarity to the regular polarity in a given amount. Conceivably, as a result of this, the inverted fog could not be sufficiently suppressed.

In light of such consideration, the present inventors conducted a further study. As a result, the present inventors found that, for example, the electrophotographic roller in accordance with the following aspect contributes to still further reduction of the inverted fog.

Namely, the electrophotographic roller in accordance with at least one aspect of the present disclosure includes a substrate, and a foamed layer on the outer circumferential surface of the substrate. The foamed layer is the surface layer of the electrophotographic roller, and has a skeleton including a binder resin and at least one conductive particle in the binder resin.

The foamed layer has a communication structure having at least one gap opening in the outer surface of the foamed layer, and extending in the thickness direction of the foamed layer. The inner wall of the gap includes the skeleton, and at least a part of at least one conductive particle is exposed at the inner wall. The thickness T of the foamed layer is 2.0 mm or more.

Then, at respective 4 sites rotated by 90 degrees in a circumferential direction of the foamed layer, at each of 3 sites of a midpoint in a longitudinal direction of the foamed layer, and points each at a distance of L/4 from each opposite end toward the midpoint, where L represents a length in the longitudinal direction of the foamed layer, a cross section with a total thickness of the foamed layer—in a direction along a circumferential direction of the electrophotographic roller is exposed. For each of the cross sections at a total of 12 sites, the inner wall of the at least one gap present in a region to a depth of 1.0 mm from an outer surface of the foamed layer is observed by a scanning electron microscope, thereby acquiring a secondary electronic image at a magnification of 5000 times, and a resolution of 18 nm/pixel, having 256 gradation steps with the lowest gradation of 0 and the highest gradation of 255, having a contrast of 1200, and an average brightness of 128±16. When the ratio Rs of the total sum of the number of pixels belonging to brightness of 200 to 255 to the total number of pixels in the secondary electronic image is determined, the average value of Rs at the 12 sites is 0.5% or more.

Further, for each of the cross sections at the total of 12 sites, the inner wall of the at least one gap present in a region to a thickness of 1.0 mm from a surface on the side of the foamed layer opposed to the substrate toward the outer surface of the foamed layer is observed by a scanning electron microscope, thereby acquiring a secondary electronic image at a magnification of 5000 times, and a resolution of 18 nm/pixel, having 256 gradation steps with the lowest gradation of 0 and the highest gradation of 255, having a contrast of 1200, and an average brightness of 128±16. When the ratio Rt of the total sum of the number of pixels belonging to brightness of 200 to 255 to the total number of pixels in the secondary electronic image is determined, an average value of Rt at the 12 sites is 0.5% or more.

The present inventors presume the reason why the electrophotographic roller in accordance with the aspect contributes to still further reduction of the inverted fog as follows. Incidentally, the effect exhibition mechanism described below is strictly presumption, and the technical scope of the electrophotographic roller in accordance with the present disclosure is not limited by the following effect exhibition mechanism.

The electrophotographic roller in accordance with the aspect has a communication structure having at least one gap opening in the outer surface of the foamed layer, and extending in the thickness direction of the foamed layer. The inner wall of the gap includes the skeleton, and at least a part of the at least one conductive particle is exposed at the inner wall. As a result of this, the toner can come in contact with at least a part of the conductive particle exposed in the gap inside.

Further, the Rs and Rt are indicators of the degree of exposure of the portion of the conductive particle exposed at the inner wall of at least one gap present in each of the region from the outer surface of the foamed layer to a depth of 1.0 mm at a cross section having the total thickness of the foamed layer—in the direction along the circumferential direction of the electrophotographic roller, and the region from the surface of the foamed layer opposed to the substrate toward the outer surface of the foamed layer to a thickness of 1.0 mm. Then, each average value of Rs and Rt being 0.5% or more indicates that a portion of the conductive particle is exposed in a given amount at the inner wall of the gap present in the vicinity of the surface of the foamed layer, and at the inner wall of the gap present at the deep portion of the foamed layer. As a result of this, in the process in which the toner comes into the gap of the foamed layer, and flows in the inside of the foamed layer, the toner comes in direct contact with the exposed portion of the conductive particle of the inner wall of the gap, so that the occasion in which electric charges are injected into the toner is sufficiently ensured. As a result, conceivably, the distribution of the electric charges held by the toner is narrowed, and the presence ratio of the toner charged to the opposite polarity to the regular polarity is reduced, so that the occurrence of the inverted fog can be suppressed.

Below, a description will be given to an electrophotographic roller in accordance with one aspect of the present disclosure.

(1) Electrophotographic Roller

An electrophotographic roller in accordance with one aspect of the present disclosure has a conductive substrate, and a foamed layer on the outer circumferential surface of the substrate. One example of the electrophotographic roller is shown in FIG. 1. An electrophotographic roller 1 shown in FIG. 1 includes a conductive substrate 3, and a foamed layer 2 provided on the outer circumferential surface thereof. The foamed layer 2 is the surface layer of the electrophotographic roller 1, and forms the outer surface.

Incidentally, the layer structure of the electrophotographic roller 1 is not limited to the one including only the substrate 3 and the foamed layer 2. The layer structure may further have another layer such as a conductive elastic layer between the substrate 3 and the foamed layer 2. Below, the configuration of the electrophotographic roller will be described in details.

Substrate

The conductive substrate 3 functions as the support layer of the electrophotographic roller and an electrode. The substrate includes a conductive material including a metal such as aluminum, a copper alloy, or a stainless steel or an alloy thereof, iron subjected to a plating treatment with chromium or nickel, a synthetic resin having conductivity, or the like. For example, the substrate may be a core metal. The substrate has, for example, a solid cylindrical or hollow cylindrical shape.

Foamed Layer

The foamed layer 2 has a skeleton including a binder resin and at least one conductive particle in the binder resin. The foamed layer 2 has a gap, i.e., the space between the skeletons. Further, the foamed layer 2 has a communication structure having at least one gap opening at the outer surface of the foamed layer 2, and extending in the thickness direction of the foamed layer 2. By allowing the foamed layer to have such a communication structure, and causing the conductive particle to be exposed at the inner wall, it is possible to perform injection of electric charges to the toner effectively.

The skeleton surface in the inside of the foamed layer 2 is referred to as an inner wall. Namely, at least a portion of the inner wall of the gap includes the skeleton. The inner wall of the gap preferably includes the skeleton. The inner wall of the gap is more preferably formed of a binder resin and a conductive particle in the binder resin. The inner wall has a structure in which at least a portion of at least one conductive particle is exposed.

Conductive Particle

The conductive particle has no particular restriction, and can be appropriately selected from known resins for use.

For example, a fine particle of carbon black; a conductive metal such as silver, gold, or copper; or a conductive metal oxide such as zinc oxide, tin oxide, or titanium oxide can be used. At least one of these can be used. The conductive particle preferably includes at least one selected from the group consisting of a conductive metal and carbon black, and more preferably includes at least one selected from the group consisting of silver, gold, and carbon black. Out of these, carbon black is relatively readily available, and can provide favorable conductivity. For this reason, the conductive particle further preferably includes carbon black. Alternatively, it is possible to use other conductive agents such as an ionic conducting agent and a fibrous carbon nanotube (CNT) together with the conductive particle in combination.

At least a portion of the conductive particle in the foamed layer is exposed from the inner wall of the foamed layer. As a result of this, electric charges can be injected to the toner, and the effect of suppressing the inverted fog can be obtained. More particularly, at least a portion of the conductive particle is preferably also exposed at the inner wall of the cell opening at the outer surface.

Figure 2:
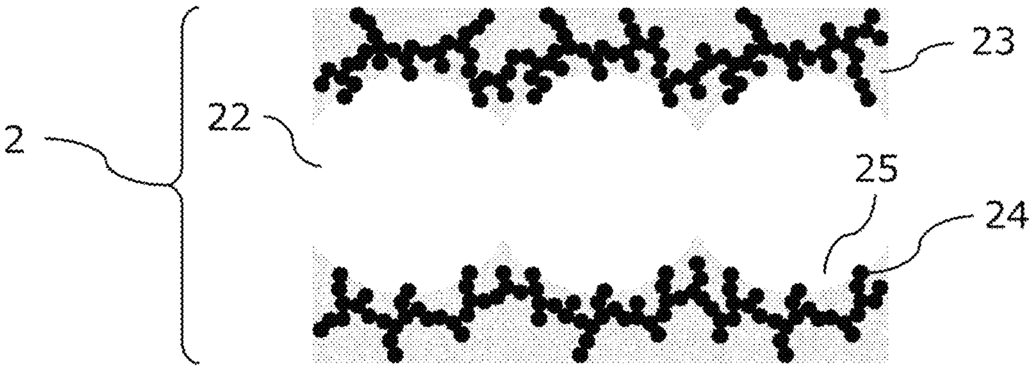
FIG. 2 is an enlarged cross sectional view of a part of the foamed layer of the electrophotographic roller in accordance with one aspect of the present disclosure.

Below, a description will be given by reference to FIG. 2, i.e., a partially enlarged view of the foamed layer inner wall of an electrophotographic roller in accordance with one aspect of the present disclosure.

The foamed layer 2 has a plurality of gaps 22 having a coupling structure in the inside of the foamed layer 2. Further, the foamed layer 2 includes a binder resin 23, and a plurality of conductive particles 24 dispersed in the binder resin 23. Then, at least a portion of the plurality of conductive particles 24 are exposed at the inner wall 25 of the foamed layer 2. Further, the term "exposure" of the particle means that at least a portion of one conductive particle 24 is not covered with the binder resin 23, and forms a portion of the inner wall of the foamed layer 2.

The exposure ratio of the conductive particle from the inner wall can be calculated by image analysis of the image photographed by a scanning electron microscope (SEM) described later. Specifically, the length in the longitudinal direction of the foamed layer 2 is assumed to be L. At respective four sites rotated by 90 degrees in the circumferential direction of the foamed layer 2, at three sites of the midpoint in the longitudinal direction of the foamed layer 2 and points each at a distance of L/4 from each opposite end toward the midpoint, the cross section with the total thickness of the foamed layer 2—in the direction along the circumferential direction of the electrophotographic roller is exposed.

As for each of the cross sections at the 12 sites, the inner wall of the at least one gap present in the region from the outer surface of the foamed layer 2 to a depth of 1.0 mm is observed by a scanning electron microscope. There is acquired a secondary electronic image at a magnification of 5000 times, and a resolution of 18 nm/pixel, and having 256 gradation steps with the lowest gradation of 0 and the highest gradation of 255, and having a contrast of 1200, and having an average brightness of 128±16. Rs represents the ratio of the total sum of the number of pixels belonging to the brightness of 200 to 255 to the total number of pixels in the secondary electronic image. The average value of Rs at the 12 sites is 0.5% or more.

Whereas, for each of the total of 12 cross sections, the inner wall of at least one gap present in the region to a thickness of 1.0 mm from the surface of the foamed layer 2 opposed to the substrate 3 toward the outer surface of the foamed layer 2 is observed by a scanning electron microscope. There is acquired a secondary electronic image at a magnification of 5000 times, and a resolution of 18 nm/pixel, and having 256 gradation steps with the lowest gradation of 0 and the highest gradation of 255, and having a contrast of 1200, and having an average brightness of 128±16. Rt represents the ratio of the total sum of the number of pixels belonging to the brightness of 200 to 255 to the total number of pixels in the secondary electronic image. The average value of Rts at the 12 sites is 0.5% or more.

In order to suppress the inverted toner amount, it is effective to inject electric charges from the toner supply roller having the foamed layer to the toner. Then, in order to obtain a high electric charge injection effect through the durability test use, it is necessary that the conductive particle is exposed at the inner wall in the inside of the foamed layer.

In the present disclosure, as described above, both of the average value of the exposure ratio of the conductive particle in the region to a depth of 1.0 mm from the outer surface of the foamed layer, and the average value of the exposure ratio in the region to a thickness of 1.0 mm from the side of the foamed layer close to the substrate toward the outer surface of the foamed layer are required to be 0.5% or more. The pixels belonging to the brightness of 200 to 255 observed under the foregoing conditions indicate the presence of the conductive particle. The foamed layer has a communication structure. For this reason, when the average value of Rs and the average value of Rt are satisfied, it is considered that the conductive particles are exposed at not only in the vicinity of the surface of the foamed layer but also to the inner wall inside the foamed layer. Namely, it is considered that the conductive particles are exposed at the inner wall through in the thickness direction of the foamed layer. The average value of Rs and the average value of Rt satisfy the foregoing range. This enables direct injection of electric charges to the toner, which can provide the effect of suppressing the inverted fog. The reason for this is considered as follows. When the average value of Rs and the average value of Rt are 0.5% or more, in the process in which the toner flows inside the foamed layer, the contact opportunity between the toner and the conductive particle can be sufficiently ensured.

The method for obtaining an electrophotographic roller in accordance with the present disclosure has no particular restriction. In order to obtain an electrophotographic roller having the conductive foamed layer where the inner wall of the gap is formed of the skeleton of the formed layer and the conductive particle is exposed at the inner wall so that the average value of Rs and the average value of Rt may be satisfied, mention may be made of the method in which a liquid mixture including a conductive particle (which will be hereinafter also referred to simply as a "liquid mixture") is used for forming the foamed layer.

As one example of the method for obtaining a foamed layer having a gap at which at least a portion of the conductive particle is exposed at the inner wall, effective is the method in which the polymerization of the polymer configuring the skeleton is sufficiently delayed than the generation of the gas by a blowing agent.

For example, the presumed mechanism in which a foamed layer having a gap at which at least a portion of the conductive particle is exposed at the inner wall thereof is formed by the foregoing method will be described by taking the case where the liquid mixture includes polyol, an isocyanate compound, water as a blowing agent, an urethanization catalyst, and a conductive particle as an example.

The liquid mixture with the foregoing composition is foamed by generation of carbon dioxide ($CO_2$) due to the reaction between water and an isocyanate compound. At this step, when urethanization reaction due to the reaction between polyol and an isocyanate compound occurs simultaneously, the viscosity of the liquid compound also rapidly increases. For this reason, when the surrounding resin component is spread out by the pressure upon expansion of the gap generated by generated $CO_2$, the conductive particle is also spread out together with the resin component, so that the conductive particle is embedded in the resin skeleton.

On the other hand, in the case where the urethanization reaction occurs with a sufficient delay to foaming, when the gap generated by the generated $CO_2$ expands, the viscosity of the surrounding resin component of the gap is still low. For this reason, even when the surrounding resin component of the gap is spread out by the pressure upon expansion of the gap, the conductive particle is less likely to move. Conceivably, such a difference in mobility between the resin component and the conductive particle with respect to the foaming pressure can form a foamed product having a gap at which at least a portion of the conductive particle is exposed at the inner wall thereof.

Because of the mechanism, for the conductive particle, a material that is less likely to move even by a foaming pressure is preferably used. Then, from this viewpoint, the conductive particle preferably includes at least carbon black, and particularly preferably is carbon black.

As described above, in the process of forming a foamed layer including polyurethane, the foaming reaction for forming a foamed structure, and the resinification reaction of polyurethane proceed. Then, sufficiently delaying of the resinification reaction than the foaming reaction can be attained by selection of the catalyst. Namely, by using a temperature-sensitive catalyst as the urethanization catalyst for controlling the resinification reaction, the progress of the resinification reaction in the foaming process is suppressed. As a result, it is possible to prevent an increase in viscosity of the resin component in the liquid mixture.

Although the temperature-sensitive catalyst is low in catalytic activity at normal temperatures, it rapidly exhibits an activity as a resinification catalyst when the temperature reaches a given temperature. At the reaction initial stage at which the solution temperature starts to increase, the catalytic activity is low. Whereas, at the reaction late period at which the temperature increases, the catalytic activity also largely increases. For this reason, at the reaction initial state, with the viscosity of the solution low, the foaming reaction can be progressed in advance. Thus, conceivably, the conductive particle could be exposed at the inner wall. Then, by using the electrophotographic roller having the foamed layer, it is possible to effectively inject electric charges to a toner.

In the case of the liquid mixture shown above, water and an isocyanate compound react with each other at, for example, a temperature of about 40 to 50° C., so that $CO_2$ is generated. Therefore, as the temperature-sensitive catalyst, a catalyst low in activity at a temperature of about 40 to 50° C., and rapidly exhibiting the activity at high temperature is preferably used. Examples of such a temperature-sensitive catalyst may include a 2-ethyl hexanoate salt of 1,5-diazabicyclo(4,3,0)nonene-7 (active temperature 100° C.), a phenol salt of 1,8-diazabicyclo(5,4,0)undencene-7 (active temperature 80° C.), and a 2-ethyl hexanoate salt of 1,8-diazabicyclo(5,4,0)undencene-7 (active temperature 100° C.). The active temperature is the temperature at which the catalytic activity of the temperature-sensitive catalyst becomes the highest.

The phenol salt of 1,8-diazabicyclo(5,4,0)undencene-7 is commercially available as, for example, "U-CAT SA1" (trade name, manufactured by San-Apro Ltd.). Further, the 2-ethyl hexanoate salt of 1,8-diazabicyclo(5,4,0)undencene-7 is commercially available as, for example, "U-CAT SA102" (trade name, manufactured by San-Apro Ltd.).

The average value of Rs and the average value of Rt become more likely to be controlled to the foregoing range by forming the foamed layer using the temperature-sensitive catalyst as described above. The average value of Rs and the average value of Rt can be made larger using a temperature-sensitive catalyst with a higher activity temperature than that of the curing reaction.

The average value of Rs is preferably 1.0% or more, more preferably 2.0% or more, and further preferably 4.0% or more. The average value of Rt is preferably 1.0% or more, more preferably 2.0% or more, and further preferably 4.0% or more. The larger the exposure ratio is, the higher the possibility of the contact between the exposed conductive particle and the toner becomes. Accordingly, the inverted toner can be reduced with efficiency.

For this reason, the upper limit has no particular restriction. The average value of Rs is preferably 1.0 to 20.0%, more preferably 2.0 to 16.0%, and further preferably 4.0 to 14.0%. Whereas, the average value of Rt is preferably 1.0 to 20.0%, more preferably 2.0 to 16.0%, and further preferably 4.0 to 14.0%.

The value of the ratio (Rs/Rt) of the average value of Rs at the 12 sites to the average value of Rt at the 12 sites is preferably 0.8 to 1.2, and more preferably 0.9 to 1.1.

The thickness T of the foamed layer is 2.0 mm or more. The thickness T being 2.0 mm or more can keep the stable contact state with other members such as the development roller. The thickness T of the foamed layer is preferably 2.0 to 5.0 mm, and more preferably 3.0 to 4.0 mm.

The primary particle diameter of the conductive particle (the arithmetical mean value of the Feret diameter of the particle also including the unexposed portion) has no particular restriction. However, in order to ensure the contact area with the toner, the primary particle diameter preferably has a given size or larger, and specifically preferably 10 nm or more. Further, in order to make the particle less likely to fall off from the formed layer during use of the electrophotographic roller, the primary particle diameter is set preferably at a given particle diameter or smaller, and specifically preferably 10 μm or less. The arithmetical mean value of the Feret diameter of the conductive particle is preferably 10 nm to 10 μm, more preferably 10 to 100 nm, and further preferably 15 to 50 nm.

For the measurement of the average particle diameter of the particle, first, the foamed layer is heated at 500° C. under a nitrogen atmosphere, thereby decomposing the binder. Subsequently, the residue is collected, and the image of the particle is photographed using a known microscope or the like. The Feret diameter set in the parallel direction with the vertical direction of the image is measured for determination. One hundred arithmetical mean values are adopted.

The content ratio of the conductive particle in the foamed layer is only required to be able to control the exposure ratio of the conductive particle within the foregoing range, and has no particular restriction. The content ratio of the conductive particle in the foamed layer is preferably 1.0 to 25.0 parts by mass, more preferably 1.0 to 20.0 parts by mass, further preferably 1.0 to 15.0 parts by mass, and furthermore preferably 2.0 to 15.0 parts by mass for every 100 parts by mass of the binder resin included in the foamed layer.

Binder Resin

The foamed layer preferably has a foamable binder resin. For example, the foamed layer preferably includes particles dispersed in the binder resin. The resin of the foamed layer has no particular restriction, and can be appropriately selected from known resins for use.

Examples thereof may include an epoxy resin, an urea resin, an ester resin, amide resin, an imide resin, an amide-imide resin, a phenol resin, a vinyl resin, a silicone resin, and a fluorine resin. As the resins of the foamed layer, the following rubber materials can also be preferably used. As the rubber materials, mention may be made of ethylene-propylene-diene copolymer rubber, acrylonitrile-butadiene rubber, chloroprene rubber, natural rubber, isoprene rubber, styrene-butadiene rubber, silicone rubber, epichlorohydrin rubber, polyurethane, and the like.

The binder resin preferably includes polyurethane. Polyurethane has an electron-donating nitrogen element in the structure, and hence can enhance the charging amount of a toner by contact with a negatively chargeable toner. For this reason, polyurethane is preferably used. Further, polyurethane is low in solution viscosity at the time of foaming, and can accordingly readily attain the exposure of the conductive particle at the inner wall by selection of the catalyst described later. Namely, the foamed layer preferably includes polyurethane as the binder resin.

As polyurethane, for example, a reaction product of known polyol and isocyanate can be used.

Polyol has no particular restriction, and can be appropriately selected from among known various polyols as the raw materials for polyurethane to be used. For example, polyols can be appropriately selected from among known polyols such as polyether polyol and polyester polyol commonly used for manufacturing soft polyurethane foam for use. Polyols may be used singly alone, or may be used in combination of two or more thereof.

Incidentally, out of the polyols, polyether polyol is used, which is preferable for manufacturing soft highly elastic polyurethane foam excellent in wet heat durability. For example, polyethylene propylene ether triol is preferable.

Further, the hardness of polyurethane configuring the skeleton of the gap of the foamed layer is expressed as, for example, the average elastic modulus measured using SPM at the surface of the inner wall. The average elastic modulus is preferably 2200 MPa or less, particularly preferably 2000 MPa or less, and further preferably 1900 MPa or less. The skeleton measured at the surface of the inner wall has such an average elastic modulus, which can relax the stress on the toner. Further, a favorable contact state with the development roller can be formed, which enables effective collection of the development residual toner, and enables smooth supply of the toner injected with electric charge by the development roller. The lower limit of the average elastic modulus has no particular restriction. In order to enable the mechanical strength of the foamed layer to be made more sufficient, and to express more reliable scrapability of the toner on the development roller surface, the lower limit of the average elastic modulus is set at preferably 1000 MPa or more, and particularly at 1300 MPa or more. The preferable range of the average elastic modulus is 1000 to 2200 MPa, further, 1000 to 2000 MPa, particularly 1300 to 2000 MPa, and furthermore 1300 to 1900 MPa.

In order to set the average elastic modulus at 2200 MPa or less, for example, mention may be made of control of the number average molecular weight of polyol, suppression of the amount of aromatic isocyanate to a given amount or less, and the like. Specifically, for example, it is effective to set the number average molecular weight of polyol at 2000 to 7000, and particularly at 3000 to 5000. By setting the number average molecular weight of polyol within the foregoing range, it is possible to ensure the length of the soft segment between urethane bonds, and it becomes easier to control the average elastic modulus within the foregoing range.

Further, the ratio (molar ratio) of the isocyanate group to an amount of a hydroxy group in polyol of 1.0 is preferably 1.1 or less, and more preferably 1.05 or less.

Isocyanate has no particular restriction, and can be appropriately selected from among conventionally known various isocyanates as the raw materials for polyurethane for use. For example, 2,4-tolylenediisocyanate (2,4-TDI), 2,6-tolylenediisocyanate (2,6-TDI), tridine diisocyanate (TODI), naphthylenediisocyanate (NDI), xylylenediisocyanate (XDI), 4,4'-diphenylmethane diisocyanate (MDI), carbodiimide-modified MDI, polymethylene polyphenyl isocyanate, polymeric isocyanate, and the like may be used singly alone or in combination of two or more thereof. Incidentally, an isocyanate group terminal prepolymer obtained by allowing isocyanate to react with one or two or more of known active hydrogen compounds can also be used as isocyanate.

In order to suppress the viscosity of the solution at the time of foaming low, isocyanate with a relatively smaller molecular weight is preferable. Isocyanate preferably includes at least one selected from the group consisting of 2,4-tolylenediisocyanate (2,4-TDI), 2,6-tolylenediisocyanate (2,6-TDI), and 4,4'-diphenylmethane diisocyanate (MDI).

The foamed layer has a communication structure having at least one gap opening at the outer surface of the foamed layer, and extending in the thickness direction of the foamed layer. The foamed layer preferably has a cell structure of continuous foam or semi-continuous foam, and more preferably has a cell structure of continuous foam. For example, for the foamed layer, the skeleton including a binder resin and a conductive particle more preferably has a continuous foam structure of forming a cell. Particularly, for the foamed layer having a cell structure of continuous foam, electric charges tend to be injected from the conductive particle exposed due to penetration of the toner into the inside of the foamed layer, so that the inverted toner can be reduced more effectively.

The porosity of the foamed layer has no particular restriction, and is preferably 50 to 97 vol %. A porosity of 50 vol % or more results in favorable flowability of the toner at the gap of the foamed layer, and a porosity of 97% or less can favorably keep the contact occasion of the toner with the conductive particle of the inner wall. The porosity is more preferably 75 to 93 vol %, and further preferably 82 to 90 vol %. The porosity can be controlled by the amount of the blowing agent, and further by the casting amount to the molding die in the case of cast curing described later.

Catalyst

The catalyst has no particular restriction, and can be appropriately selected from among known various catalysts for use. In order to cause the conductive particle to be exposed at the inner wall, a temperature-sensitive catalyst having activity in resinification reaction of urethane is preferably used. As the temperature-sensitive catalysts, mention may be made of 2-ethyl hexanoate salt of 1,5-diazabicyclo(4,3,0)nonene-7 (active temperature 100° C.), a phenol salt of 1,8-diazabicyclo(5,4,0)undencene-7 (active temperature 80° C.), 2-ethyl hexanoate salt of 1,8-diazabicyclo(5,4,0)undencene-7 (active temperature 100° C.), and the like. The active temperature represents the temperature at which the catalytic activity of the temperature-sensitive catalyst becomes the highest.

Further, the catalyst having activity in resinification reaction of polyurethane, and the foaming reaction thereof can be appropriately selected for use. For example, amine type catalysts (such as triethylene diamine, bis(dimethlyaminoethyl) ether, N,N,N',N'-tetramethylhexanediamine, 1,8-diazabicyclo(5,4,0)undencene-7,1,5-diazabicyclo(4,3,0)nonene-5,1,2-dimethylimidazole, N-ethylmorpholine, and N-methylmorpholine), organic metal type catalysts (such as tin octoate, tin oleate, dibutytin dilaurate, dibutyltin diacetate, tetra-i-propoxy titanium, tetra-n-butoxytitanium, and tetrakis(2-ethylhexyloxy) titanium), acid salt catalyst obtained by reducing the initial activity of the amine type catalyst and organic metal type catalysts (such as carboxylic acid salt and formic acid salt, octyl acid salt, and boric acid salt) may be used singly alone, or in combination of two or more thereof in combination with the temperature-sensitive catalyst.

Others

If required, a foam stabilizer, and other auxiliaries can be used.

When the binder resin of the foamed layer in accordance with the present disclosure is polyurethane or polyurea, by using water as a blowing agent as described previously, a carbonic acid gas can be generated by the reaction with an isocyanate compound. Other blowing agents and water may be used in combination.

The foam stabilizer has no particular restriction, and can be appropriately selected from among known various foam stabilizers for use.

As other auxiliaries, if required, a crosslinking agent, a vulcanizing agent, a vulcanization accelerator, a vulcanization auxiliary, a flame retardant, a colorant, an UV absorber, an antioxidant and the like may be used in such a range as not to hinder the effect of the present disclosure.

Formation Method of Foamed Layer

The foaming method of the foamed layer has no particular restriction. Any of the method using a blowing agent, the method for mixing bubbles by mechanical stirring, and other methods can be used. Incidentally, the foaming ratio may be appropriately determined, and has no particular restriction. The foamed layer is preferably a foamed/cured product of a liquid mixture for forming the foamed layer (which will be also hereinafter referred to simply as “liquid mixture”).

For example, when the binder resin is polyurethane, the liquid mixture for forming the foamed layer obtained by mixing the following materials of 1 to 4(preferably 1 to 5) is foamed and cured. As a result, the foamed layer in accordance with the present disclosure can be obtained. Namely, the method for manufacturing an electrophotographic roller preferably has a step of foaming and curing a liquid mixture for forming a foamed layer including the following materials 1 to 4, preferably the following materials 1 to 5.

1. As the materials for forming a binder resin,
   polyol such as polyether polyol or polyester polyol
   isocyanate compound
2. conductive particle
3. catalyst (catalyst preferably including a temperature-sensitive catalyst)
4. blowing agent
5. foam stabilizer The joining method of the substrate and the foamed layer has no particular restriction. The following methods can be used. The method (cast molding method) in which the substrate is previously provided inside a mold (molding die), and the liquid mixture is injected into a die for cast molding, and is foamed/cured; and the method (prior molding method) in which the foamed/cured product of the liquid mixture is previously molded, and then, is molded into the shape of the foamed layer to be bonded with the substrate; and other methods. With any method, if required, an adhesion layer having conductivity can be provided between the substrate and the foamed layer. As the adhesion layer, known materials such as an adhesive and a hot melt sheet can be used.

In the case using the cast molding method, a release agent may be previously applied to the molding die inner wall. As the release agent, a known release agent can be used. Examples thereof may include an aqueous release agent including an olefin component and a silicone component, and a release agent obtained by dissolving a fluorine component in a fluorine type solvent. In order to form the opening of the foamed layer outer surface with ease, it is preferable to use an aqueous release agent including an olefin component and a silicone component.

In the case using the prior molding method, the manufacturing method of the foamed/cured product of the liquid mixture has no particular restriction. Examples thereof may include, other than the method of casting into the mold in a prescribed shape, and other methods, a method in which the product is cut out from the foamed product in a block state (so-called slab foam) into prescribed dimensions by cutting machining, followed by polishing into a cylindrical shape, and the method for molding into prescribed dimensions by an extruding machine.

In order to supply the toner injected with electric charges by a toner supply roller to the development roller with efficiency, the toner on the development roller that has returned to the developer container without development is required to be scraped off by the toner supply roller. The scrapability of the toner by the toner supply roller is largely affected by the shape of the foamed layer surface. Particularly, in the case of the shape of the foamed layer surface in which the opening is surrounded with a small change in height in the radial direction of the roller at the edge of the opening, a continuous edge can effectively scrape off the toner on the development roller.

Specifically, the outer circumferential surface of the electrophotographic roller and a first surface, i.e., one surface of a glass plate are brought into contact with each other so that the indentation amount of the glass plate with respect to the electrophotographic roller may become 1.0 mm. In this state, the contact portion between the electrophotographic roller and the glass plate is observed from the side of a second surface of the glass plate opposite to the first surface. At this step, the edge of the opening of the gap preferably surrounds the opening.

Incidentally, the indentation amount represents, with the indentation amount when the glass plate held horizontal has been brought closer from vertically above the electrophotographic roller to be observed, and the electrophotographic roller and the first surface of the glass plate have come into contact with each other for the first time assumed to be 0.0 mm, the amount (distance) of the movement of the glass plate therefrom toward the electrophotographic roller.

From the observation, in order to form the surface profile in which the edge surrounds the opening, preferably, an urethane rubber composition is casted into a mold in a prescribed shape, thereby molding a foamed layer by the foaming curing method.

The kind of the resin in the foamed layer can be confirmed by known pyrolysis GC/MS, FT-IR, $^{13}$C-NMR, or the like.

The kind of the conductive particle and the composition ratio thereof can be confirmed by known energy dispersive X-ray spectrometry (EDS), X-ray diffraction (XRD), or the like. The EDS analysis can provide the metal element species of the particle and the composition ratio thereof. Further, when the particle has crystallinity, XRD of the particle powder left upon pyrolysis of the foamed layer under a nitrogen atmosphere can provide a more particular composition formula.

(2) Process Cartridge

The present disclosure provides a process cartridge configured detachably with respect to the main body of an electrophotographic image forming apparatus, and including the electrophotographic roller. The process cartridge preferably includes a development roller for conveying a toner to a photosensitive member and the surface of the photosensitive member. The process cartridge preferably includes a toner supply roller for supplying a toner to the surface of the development roller. Then, the electrophotographic roller is preferably a toner supply roller.

Figure 3:
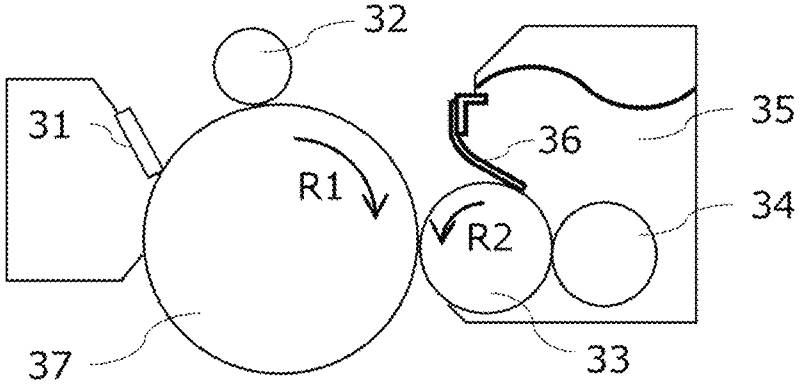
FIG. 3 is a schematic block view showing a process cartridge in accordance with one aspect of the present invention.

The process cartridge in accordance with one aspect of the present disclosure will be described by reference to the accompanying drawings. However, the present disclosure is not limited thereto. FIG. 3 is a schematic block view showing one example of the process cartridge using the electrophotographic roller in accordance with one aspect of the present disclosure as a toner supply roller 34.

The process cartridge shown in FIG. 3 has a cleaning blade 31, a charging roller 32, a development roller 33, a toner supply roller 34, a toner 35, a toner regulating member 36, and a photosensitive member 37, and has a configuration detachable with respect to the main body of the electrophotographic apparatus.

The photosensitive member 37 is charged by the charging roller 32, and is rotated in an arrow R1 direction. The process cartridge has a contact point member to be electrically connected with the electric contact of the main body when mounted on the main body of the electrophotographic image forming apparatus. The electrical connection provides a configuration such that a voltage can be applied between the development roller 33 and the toner supply roller 34, and enables performing of electric charge injection to the toner inside the foamed layer. The toner supply roller 34 comes in contact with the development roller 33, and is rotated, thereby supplying the toner to the surface of the development roller 33. The toner regulating member 36 is in contact with the development roller 33, thereby regulating the toner amount on the surface of the development roller 33. The development roller 33 is rotated in an arrow R2 direction, thereby conveying the toner to the developing zone where the development roller 33 and the photosensitive member 37 are opposed to each other.

The process cartridge in accordance with the present disclosure adopts a so-called contact development system configured such that the development roller 33 is arranged in contact with the photosensitive member 37. The toner left on the photosensitive member 37 after transfer to paper is scraped off by the cleaning blade 31, and is accommodated in a cleaner container.

(3) Developing Apparatus

The electrophotographic roller may be used as a toner supply roller at the developing apparatus including at least a development roller, and a toner supply roller for supplying a toner to the development roller. It is configured such that a voltage can be applied between the development roller and the toner supply roller, and electric charges can be injected to the toner inside the foamed layer.

(4) Electrophotographic Image Forming Apparatus

The present disclosure provides an electrophotographic image forming apparatus including the electrophotographic roller. The electrophotographic image forming apparatus may be, for example, an electrophotographic image forming apparatus including the developing apparatus.

Further, the electrophotographic image forming apparatus includes, for example, a photosensitive member, a development roller for conveying a toner to the surface of the photosensitive member, a toner supply roller for supplying a toner to the surface of the development roller, and a cleaning roller for cleaning the photosensitive member. Then, the electrophotographic roller is preferably a toner supply roller.

EXAMPLES

Below, the present disclosure will be described by way of Examples and Comparative Examples. However, the present disclosure is not limited to the Examples, and the like at all. Incidentally, the terms "part(s)" in Examples and Comparative Examples are all on the basis of mass unless otherwise specified.

Example 1

As shown in FIGS. 4A to 4C, a mold including a cylindrical member 42 with an inside diameter of 11 mm coated with a release agent on the inner surface thereof, an upper bridge member 43, and a lower bridge member 41, and a substrate 44 with an outer diameter of 4 mm made of stainless steel (SUS304) as the substrate were prepared, and all were preheated to 80° C.

The cylindrical member 42 was mounted on the lower bridge member 41, and the substrate 44 was arranged (FIG. 4A). The one obtained by previously mixing the following materials (A) to (F) are referred to as a solution B, and a material (G) is referred to as a solution A. A urethane rubber composition 45, i.e., the liquid mixture for forming the foamed layer obtained by mixing the solution A and the solution B was injected from the space between the cylindrical member 42 and the substrate 44 (FIG. 4B). Incidentally, mixing of the solution A and the solution B was performed immediately before the injection.

After injecting the urethane rubber composition 45, the upper bridge member 43 was mounted on the upper end face of the cylindrical member 42, and the substrate 44 was held concentrically with the cylindrical member 42 by the upper bridge member 43 and the lower bridge member 41 (FIG. 4C). The injection amount of the urethane rubber composition 45 was set at 2.3 g.

(A) Polyol (polyethylene propylene ether triol with a number average molecular weight of 3100, trade name: ACTOCOL EP-550N, manufactured by MITSUI CHEMICAL Inc.): 100.0 parts (B) conductive particle (trade name: LIONITE CB, manufactured by Lion Specialty Chemicals Co., Ltd.): 3.0 parts (C) foam stabilizer (trade name: Niax Silicone L-3640, manufactured by Momentive Performance Materials Inc.): 0.4 part (D) temperature-sensitive catalyst (2-ethyl hexanoate salt of 1,5-diazabicyclo(4,3,0)nonene-7, trade name: U-CAT 1102, manufactured by San-Apro Ltd.): 0.25 part (E) tertiary amine catalyst (mixture of triethylenediamine and dipropylene glycol, trade name: DABCO 33 LV, manufactured by Evonik Co.): 0.5 part (F) blowing agent (water): 1.5 parts (G) isocyanate admixture (including NCO=45%, MDI=20%, trade name: COSMONATE TM20, manufactured by MITSUI CHEMICAL Inc.): 24.4 parts Subsequently, with the cylindrical member 42, the upper bridge member 43, and the lower bridge member 41 being integrated, the state heated to 80° C. was held for 10 minutes, thereby foaming and curing the urethane rubber composition 45. After cooling to 50° C., the upper bridge member 43 and the lower bridge member 41 were removed, and the substrate 44 including the foamed layer formed on the outer circumferential surface was demolded from the cylindrical member 42, resulting in an electrophotographic roller Y-1 in accordance with Example 1. The thickness T of the foamed layer was 3.5 mm.

Measurement of Average Value of Exposure Ratio Rs and Average Value of Rt of Conductive Particle The foamed layer was cut out at the surface of the electrophotographic roller Y-1 orthogonal to the longitudinal direction of the substrate. Namely, the cross section with the total thickness of the foamed layer—in the direction along the circumferential direction of the electrophotographic roller was exposed. The surface corresponding to the cross section of the foamed layer, of the resulting section was subjected to platinum vacuum evaporation (trade name: E-1045, manufactured by Hitachi High-Tech Corporation, discharge voltage: 15 mA, discharge time: 30 seconds), thereby manufacturing an observation sample.

Then, for the section, the inner wall of the gap present in the region to a depth of 1.0 mm from the outer surface of the cut cross section was observed using a SEM (trade name: JSM-7800F, manufactured by JEOL Co.). Specifically, as shown in FIG. 5, the center 53 of the inscribed circle 52 of the cell 51 at the cut surface was arranged at the center of the observation screen. Then, with the position still being kept, the magnification was increased to 5000 times, thereby acquiring a secondary electronic image. At this step, when a coupling hole 54 was reflected at even a portion of the observation screen, photographing of the cell was not performed.

Incidentally, the measurement conditions for the SEM are as follows. Measurement magnification: 5000 times, resolution: 18 nm/pixel, acceleration voltage: 2 kV, irradiation current: 8, contrast: 1200, and brightness: adjusted so that the average brightness upon conversion into a monochromatic image of 256 gradation may become 128±16.

Further, the resulting secondary electronic image was imported to image processing software Image J, and was converted to a monochromatic image of 256 gradation (brightness 0 being black, and 255 being white), thereby calculating the ratio Rs of the total sum of the number of pixels of brightness 200 to 255 to the total number of pixels in the entire image region.

The operations was performed at a total of 12 sites, of respective 4 points rotated by 90° in the circumferential direction at the cross sections at 3 sites of the midpoint in the longitudinal direction of the foamed layer, and points at a distance of L/4 from each opposite end toward the midpoint, namely, at positions of L/4, L/2, and 3L/4 where L represents the total length in the longitudinal direction of the foamed layer. The arithmetical mean value of the resulting Rs at 12 sites was calculated.

The same operation was also performed in the region to a thickness of 1.0 mm from the substrate of the foamed layer toward the outer surface of the foamed layer, thereby calculating the arithmetical mean value of Rt.

Observation of Surface Profile of Foamed Layer

With the outer circumferential surface of the electrophotographic roller Y-1 and the first surface of the glass plate brought into contact with each other so that the indentation amount of the glass plate with respect to the electrophotographic roller Y-1 may become 1.0 mm, the contact portion between the electrophotographic roller Y-1 and the glass plate was observed from the side of the second surface opposite to the first surface of the glass plate. Then, whether the edge of the opening surrounded the opening, or not was confirmed.

The state in which the edge of the opening surrounds the opening indicates the state in which the opening 26 is surrounded by the continuous edge of the binder resin 23 as shown in FIG. 6A. FIG. 6B is the example of the case of no surrounding.

In the present disclosure, 100 openings were observed. When 98% or more thereof are surrounded, it was determined that for the electrophotographic roller, the edge of the opening surrounded the opening.

Incidentally, the indentation amount represents, with the indentation amount when the glass plate held horizontal has been brought closer from vertically above the electrophotographic roller to be observed, and the electrophotographic roller and the first surface of the glass plate have come into contact with each other for the first time assumed to be 0.0 mm, the amount (distance) of the movement of the glass plate therefrom toward the electrophotographic roller.

Measurement of SPM Elastic Modulus

The cross section of the electrophotographic roller Y-1 was cut into a thin piece by cutting machining using a diamond knife while being held at −110° C. by a CRYO-MICROTOME (trade name: EMFC6, manufactured by Leica Mcrosystems Co.). Further, a sample of 100 μm square and with a width in the depth direction of 100 μm was manufactured from the thin piece. The elastic modulus of the surface of the inner wall including a polyurethane resin of the skeleton was measured. For the measurement, a SPM apparatus (trade name: MFP-3D-Origin, manufactured by Oxford Instruments Co.), and a probe (trade name: AC160, manufactured by Olympus Corporation) were used. At this step, the force curve was measured a total of 25 times at 5 vertical×5 horizontal locations, and was determined as the arithmetic average of those at 23 points except for the highest value and the lowest value, and the elastic modulus was calculated with the Hertz theory.

Measurement of Porosity

The electrophotographic roller Y-1 was cut together with the substrate into a 10-mm cylindrical shape, thereby obtaining a three-dimensional image using a three-dimensional measurement X-ray CT apparatus (model: TDM1001-II, manufactured by Yamato Scientific Co., Ltd.). The porosity was determined from the resulting three-dimensional image using the following equation (1). Incidentally, the measurement conditions are as follows. Target material: tungsten, filament material: tungsten, and X-ray intensity: 100 kV.

$$\text{Porosity } (vol\ \%) = \text{volume of gap}/(\text{volume of cylinder} - \text{volume of substrate}) \quad (1)$$

Measurement of Content of Conductive Particle for Every 100 Parts by Mass of Binder Resin When the content of the conductive particle is determined from the electrophotographic roller, the following method can be used.

After removing the foamed layer from the core metal, and measuring the mass, heating was performed under a nitrogen atmosphere at 500° C., thereby decomposing the binder resin. Subsequently, the residue of the conductive particle was collected, and the mass was measured. The (mass of foamed layer-mass of conductive particle) is referred to as the mass of the binder resin. The content of the conductive particle for every 100 parts by mass of the binder resin was determined from the masses.

Image Evaluation

With the electrophotographic roller to be evaluated assumed as a toner supply roller, evaluation of the fog was performed.

First, the toner supply roller was removed from the black cartridge of a color laser printer (trade name: laser beam printer Satera LBP674C, manufactured by Canon Corp.), and a toner supply roller to be evaluated was mounted thereon. The cartridge and the laser printer were set under high temperature high humidity environment (temperature: 30.0° C., relative humidity: 80%), and then, were allowed to stand still for 12 hours or more.

Then, one 0%-print solid white image was outputted, and was measured for the reflectance (%) by a reflection densitometer (trade name: TC-6DS/A, manufactured by Tokyo-Denshoku co., Ltd.). The numerical value obtained by subtracting the obtained reflectance from the reflectance (%) of the unused printout paper (standard paper) measured in the same manner was referred to as the initial fog value (%).

Subsequently, during output of the solid white image, the power supply of the color laser printer was turned off, and the process cartridge was taken out. Then, the ratio of the inverted toner in the toner on the development roller was measured using a charging amount·particle diameter distribution measurement machine (trade name: E-spart Analyzer Model EST-III, manufactured by HOSOKAWA MICRON CORPORATION). With the toner with a charging amount Q/M (μC/g) of more than 0 as the inverted toner, the ratio thereof was calculated (FIG. 7), which was referred to as the initial positive toner ratio (%). Incidentally, the number of the measurement particles was set at about 3000.

Thereafter, 5000 1% print images were outputted continuously, and then the same operation as described above was performed, thereby measuring the fog value (%) after the durability test and the positive toner ratio (%) after the durability test.

Examples 2 to 8, and 10 to 11

(B) Electrophotographic rollers Y-2 to Y-8, and Y-10 and Y-11 in accordance with Examples 2 to 8, and 10 and 11 were manufactured in the same manner as in Example 1, except for changing the kind and the mixing amount of the conductive particle as described in Table 1-1, and were evaluated in the same manner as in Example 1.

The used materials (trade names) are as follows.

TOOKA BLACK #5500 (TOKAI CARBON CO., LTD.)

Ketjen black EC600JD (Lion Specialty Chemicals Co., Ltd.)

Ag nanoparticle (Sigma Aldrich)

Au nanoparticle (Sigma Aldrich)

Example 9

(B) An electrophotographic roller Y-9 in accordance with Example 9 was manufactured in the same manner as in Example 1, except for changing the mixing amount of the conductive particle to 1.3 parts, and further adding carbon nanotube (trade name: FloTube 9100, manufactured by CNano Co.) in an amount of 2 parts as a conductive agent other than the conductive particle, and was evaluated in the same manner as in Example 1.

Examples 12 to 14

(D) Electrophotographic rollers Y-12 to Y-14 in accordance with Examples 12 to 14 were manufactured in the same manner as in Example 1, except for changing the kind and the mixing amount of the temperature-sensitive catalyst as described in Table 1-2, and were evaluated in the same manner as in Example 1.

The used materials (trade names) are as follows.

U-CAT SA102 (trade name, manufactured by San-Apro Ltd.)

2-ethyl hexanoate salt of 8-diazabicyclo[5.4.0]undencene-7 (DBU)

active temperature: 100° C.

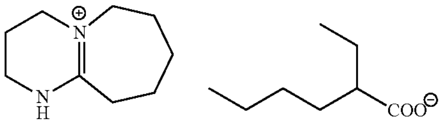

U-CAT SA1 (trade name, manufactured by San-Apro Ltd.)

phenol salt of 1,8-diazabicyclo[5.4.0]undencene-7 active temperature: 80° C.

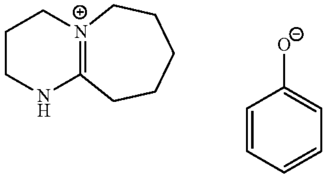 [SMILES: C1CCC2=[N+](CC1)CCCN2 ; [O-]c1ccccc1]

Example 15

(A) An electrophotographic roller Y-15 in accordance with Example 15 was manufactured in the same manner as in Example 1, except for changing the kind of polyol to polyester polyol with a number average molecular weight of 1000 (trade name: Curaray polyol P-1020, manufactured by Kuraray Co., Ltd.), and changing the mixing amount of (G) isocyanate admixture to 31.7 parts, and was evaluated in the same manner as in Example 1.

Examples 16 to 20

(F) Electrophotographic rollers Y-16 to Y-20 in accordance with Examples 16 to 20 were manufactured in the same manner as in Example 1, except for changing the amount of water and the mixing amount of (G) isocyanate admixture as described in Table 1-2, and were evaluated in the same manner as in Example 1.

Examples 21 to 23

The inside diameter of the cylindrical member 42 shown in FIGS. 4A to 4C was changed to an inside diameter of 13 mm, and the urethane rubber composition 45 obtained by mixing the materials as in Table 1-2 was injected in an amount of 3.4 g to the cylindrical member 42. Subsequently, a roller was manufactured by performing foaming and curing in the same manner as in Example 1. Further, the outer circumferential surface of the obtained roller was polished at a rotation speed of 1800 rpm, and a feed speed of 800 mm/min so that the outer diameter may become 11 mm, thereby manufacturing electrophotographic rollers Y-21 to Y-23 in accordance with Example 21 to 23. Further, evaluation was performed in the same manner as in Example 1.

Comparative Example 1

An electrophotographic roller X-1 was manufactured in the same manner as in Example 1, except for adding silica ($SiO_2$, trade name: MSN-002, manufactured by TAYCA CORPORATION) in an amount of 5 parts in place of adding the (B) conductive particle, and was evaluated in the same manner as in Example 1.

Comparative Example 2

An electrophotographic roller X-2 was manufactured in the same manner as in Example 1, except for adding an ionic conducting agent (Li-TFSI, trade name: EF-N115, manufactured by Mitsubishi Materials Electronic Chemicals Co., Ltd.) in an amount of 1 part in place of adding the (B) conductive particle, and was evaluated in the same manner as in Example 1.

Comparative Example 3

An electrophotographic roller X-3 was manufactured in the same manner as in Example 1, except for not adding the (B) conductive particle, and was evaluated in the same manner as in Example 1.

Comparative Example 4

An electrophotographic roller X-4 was manufactured in the same manner as in Example 1, except for not adding the (D) temperature-sensitive catalyst, and was evaluated in the same manner as in Example 1.

Comparative Example 5

The electrophotographic roller X-4 was irradiated with a low pressure mercury lamp (trade name: GLQ500US/11, manufactured by HARRISON TOSHIBA LIGHTING, Inc.) to perform a surface treatment, thereby manufacturing an electrophotographic roller X-5, and evaluating it in the same manner as in Example 1.

For the surface treatment, irradiation was performed for 5 minutes with a light amount of 4000 mJ/cm$^2$ by the sensitivity at a 254-nm sensor while rotating the roller. As a result of the surface treatment, the exposure ratio Rs of the conductive particle in the region to a depth of 1.0 mm from the outer surface became 3.0%.

TABLE 1-1

| | | Roller No. | | | | | | | | | | |
|---|---|---|---|---|---|---|---|---|---|---|---|---|
| | | Y-1 | Y-2 | Y-3 | Y-4 | Y-5 | Y-6 | Y-7 | Y-8 | Y-9 | Y-10 | Y-11 |
| ACTOCOL EP-550N | (A) | 100 | 100 | 100 | 100 | 100 | 100 | 100 | 100 | 100 | 100 | 100 |
| CURARY POLYOL P-1020 | | — | — | — | — | — | — | — | — | — | — | — |
| LIONITE CB | (B) | 3.0 | 9.0 | 18.5 | 1.3 | 25.0 | 0.7 | — | — | 1.3 | — | — |
| TOOKA BLACK #5500 | | — | — | — | — | — | — | 5.0 | — | — | — | — |
| KETJEN BLACK EC600JD | | — | — | — | — | — | — | — | 3.0 | — | — | — |
| Ag nanoparticle | | — | — | — | — | — | — | — | — | — | 5.0 | — |
| Au nanoparticle | | — | — | — | — | — | — | — | — | — | — | 5.0 |
| Number of parts to binder resin (B)/((A) + (G)) × 100 | | 2.4 | 7.2 | 14.9 | 1.0 | 20.1 | 0.6 | 4.0 | 2.5 | 1.0 | 4.0 | 4.0 |
| L-3640 | (C) | 0.4 | 0.4 | 0.4 | 0.4 | 0.4 | 0.4 | 0.4 | 0.4 | 0.4 | 0.4 | 0.4 |
| U-CAT 1102 | (D) | 0.25 | 0.25 | 0.25 | 0.25 | 0.25 | 0.25 | 0.25 | 0.25 | 0.25 | 0.25 | 0.25 |
| U-CAT SA102 | | — | — | — | — | — | — | — | — | — | — | — |
| U-CAT SA1 | | — | — | — | — | — | — | — | — | — | — | — |
| DABCO 33 LV | (E) | 0.5 | 0.5 | 0.5 | 0.5 | 0.5 | 0.5 | 0.5 | 0.5 | 0.5 | 0.5 | 0.5 |
| Water | (F) | 1.5 | 1.5 | 1.5 | 1.5 | 1.5 | 1.5 | 1.5 | 1.5 | 1.5 | 1.5 | 1.5 |
| TM-20 | (G) | 24.4 | 24.4 | 24.4 | 24.4 | 24.4 | 24.4 | 24.4 | 24.4 | 24.4 | 24.4 | 24.4 |
| Flotube9100 | Others | — | — | — | — | — | — | — | — | 2 | — | — |
| Roller polishing | | — | — | — | — | — | — | — | — | — | — | — |

TABLE 1-2

| | | Roller No. | | | | | | | | | | | |
|---|---|---|---|---|---|---|---|---|---|---|---|---|---|
| | | Y-12 | Y-13 | Y-14 | Y-15 | Y-16 | Y-17 | Y-18 | Y-19 | Y-20 | Y-21 | Y-22 | Y-23 |
| ACTOCOL EP-550N | (A) | 100 | 100 | 100 | — | 100 | 100 | 100 | 100 | 100 | 100 | 100 | 100 |
| CURARY POLYOL P-1020 | | — | — | — | 100 | — | — | — | — | — | — | — | — |
| LIONITE CB | (B) | 3.0 | 3.0 | 3.0 | 3.0 | 3.0 | 3.0 | 3.0 | 3.0 | 3.0 | 3.0 | 9.0 | 1.3 |
| TOOKA BLACK #5500 | | — | — | — | — | — | — | — | — | — | — | — | — |

TABLE 1-2-continued

| | | Roller No. | | | | | | | | | | | |
|---|---|---|---|---|---|---|---|---|---|---|---|---|---|
| | | Y-12 | Y-13 | Y-14 | Y-15 | Y-16 | Y-17 | Y-18 | Y-19 | Y-20 | Y-21 | Y-22 | Y-23 |
| KETJEN BLACK EC600JD | | — | — | — | — | — | — | — | — | — | — | — | — |
| Ag nanoparticle | | — | — | — | — | — | — | — | — | — | — | — | — |
| Au nanoparticle | | — | — | — | — | — | — | — | — | — | — | — | — |
| Number of parts to binder resin (B)/((A) + (G)) × 100 | | 2.4 | 2.4 | 2.4 | 2.3 | 2.5 | 2.4 | 2.5 | 2.3 | 2.2 | 2.4 | 7.2 | 1.0 |
| L-3640 | (C) | 0.4 | 0.4 | 0.4 | 0.4 | 0.4 | 0.4 | 0.4 | 0.4 | 0.4 | 0.4 | 0.4 | 0.4 |
| U-CAT 1102 | (D) | 0.15 | — | — | 0.25 | 0.25 | 0.25 | 0.25 | 0.25 | 0.25 | 0.25 | 0.25 | 0.25 |
| U-CAT SA102 | | — | 0.15 | — | — | — | — | — | — | — | — | — | — |
| U-CAT SA1 | | — | — | 0.15 | — | — | — | — | — | — | — | — | — |
| DABCO 33 LV | (E) | 0.5 | 0.5 | 0.5 | 0.5 | 0.5 | 0.5 | 0.5 | 0.5 | 0.5 | 0.5 | 0.5 | 0.5 |
| Water | (F) | 1.5 | 1.5 | 1.5 | 1.5 | 1.2 | 1.65 | 1.05 | 1.8 | 1.5 | 1.5 | 1.5 | 1.5 |
| TM-20 | (G) | 24.4 | 24.4 | 24.4 | 31.7 | 21.7 | 26.4 | 20.1 | 28.0 | 28.1 | 24.4 | 24.4 | 24.4 |
| Flotube9100 | Others | — | — | — | — | — | — | — | — | — | — | — | — |
| Roller polishing | | — | — | — | — | — | — | — | — | — | Imple-mented | Imple-mented | Imple-mented |

In the Tables, the number of parts to the binder resin represents the parts by mass of the conductive particle for every 100 parts by mass of the binder resin.

TABLE 2

| | | Roller No. | | | | |
|---|---|---|---|---|---|---|
| | | X-1 | X-2 | X-3 | X-4 | X-5 |
| (A) | ACTOCOL EP 550N | 100 | 100 | 100 | 100 | 100 |
| (B) | LIONITE CB | — | — | — | 3.0 | 3.0 |
| Number of parts to binder resin (B)/((A) + (G)) × 100 | | — | — | — | 2.4 | 2.4 |
| (C) | L-3640 | 0.4 | 0.4 | 0.4 | 0.4 | 0.4 |
| (D) | U-CAT 1102 | 0.25 | 0.25 | 0.25 | — | — |
| (E) | DABCO 33 LV | 0.5 | 0.5 | 0.5 | 0.5 | 0.5 |
| (F) | Water | 1.5 | 1.5 | 1.5 | 1.5 | 1.5 |
| (G) | TM-20 | 24.4 | 24.4 | 24.4 | 24.4 | 24.4 |
| Others | SiO2 | 5 | — | — | — | — |
| | LiTFSI | — | 1 | — | — | — |
| | Roller polishing | — | — | — | — | — |
| | UV treatment | — | — | — | — | Per-formed |

The evaluation results of respective Examples and Comparative Examples are shown in Tables 3-1, 3-2, and 4.

In Examples 1 to 23, the average values Rs and Rt of the exposure ratios of the conductive particles were both 0.5% or more. For this reason, the electric charge injection effect to the toner was large, and the positive toner ratio was also low even after the durability test of 5000 paper sheets. For this reason, the suppression effect of fog on paper could be obtained.

Out of these, in Examples 1 to 3, Example 5, Examples 7 and 8, Examples 10 to 15, and Examples 20 to 22, both of Rs and Rt were 4.0% or more. For this reason, higher suppression effect of fog on paper could be obtained.

Further, in Examples 2 to 3, Examples 7 and 8, and Examples 13 to 15, both of Rs and Rt were 4.0% or more, and the porosity was 82 vol % to 90 vol %, further, the conductive particle was carbon black, and in addition, the structure was configured such that the edge of the opening of the foamed layer surrounded the opening, and further additionally, the average elastic modulus of the foamed layer inner wall was 2000 MPa or less. Accordingly, a particularly high suppression effect of fog on paper could be obtained.

Further, in Examples 1 and 2, and Example 4, both of Rs and Rt were 0.5% or more, and the shape was such that the opening was surrounded with a small change in the height in the radial direction at the edge of the opening of the foamed layer surface. For this reason, it is possible to supply toner injected with electric charges in a larger amount to the development roller. For this reason, in Examples 1 and 2, and 4, conceivably, the positive toner ratio was also lower, and a higher effect of suppressing fog on paper could be obtained as compared with Examples 21 to 23.

In Comparative Examples 1 to 4, both of Rs and Rt were less than 0.5%. For this reason, the electric charge injection effect to the toner was low. Accordingly, even after the durability test of 5000 paper sheets, the positive toner ratio was also high. For this reason, the suppression effect of fog on paper could not be obtained.

In Comparative Example 2, although the presence of the ionic conducting agent resulted in favorable initial fog on paper, much fog on paper is generated after the durability test of 5000 paper sheets. It is considered as follows. The ionic conducting agent undergoes conduction deterioration due to use in the durability test. For this reason, the electric charge injection effect after use in the durability test was lowered.

In Comparative Example 5, although Rs became 0.5% or more due to ultraviolet irradiation, Rt became less than 0.5%. For this reason, it is considered as follows. The sufficient electric charge injection effect to the toner could not be obtained, so that the suppression effect of fog on paper could not obtained.

TABLE 3-1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Roller No. | Y-1 | Y-2 | Y-3 | Y-4 | Y-5 | Y-6 | Y-7 | Y-8 | Y-9 | Y-10 | Y-11 | Y-12 |
| Porosity [%] | 87 | 85 | 82 | 89 | 80 | 90 | 86 | 87 | 88 | 87 | 87 | 88 |
| Surface profile | Sur-rounded | Sur-rounded | Sur-rounded | Sur-rounded | Sur-rounded | Sur-rounded | Sur-rounded | Sur-rounded | Sur-rounded | Sur-rounded | Sur-rounded | Sur-rounded |

TABLE 3-1-continued

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Elastic modulus [MPa] | | 1500 | 1600 | 1700 | 1500 | 1900 | 1400 | 1500 | 1400 | 1500 | 1700 | 1700 | 1500 |
| Conductive particle exposure ratio | Rs (surface side) [%] | 5.2 | 10.9 | 13.5 | 1.6 | 18.2 | 0.5 | 7.2 | 5.9 | 1.8 | 6.2 | 5.8 | 3.8 |
| | Rt (substrate side) [%] | 5.4 | 11.0 | 13.8 | 1.6 | 18.0 | 0.6 | 7.3 | 6.0 | 1.9 | 6.0 | 5.8 | 3.5 |
| Durability test initial stage | Positive toner ratio [%] | 12.6 | 11.8 | 12.5 | 15.0 | 16.0 | 17.2 | 13 | 13.1 | 14.4 | 13.1 | 13.4 | 14.1 |
| | Fog on paper [%] | 0.7 | 0.6 | 0.7 | 1.0 | 1.1 | 1.2 | 0.7 | 0.8 | 0.9 | 0.8 | 0.8 | 0.9 |
| After durability test of 5000 paper sheets | Positive toner ratio [%] | 14.9 | 14.2 | 12.5 | 16.7 | 15.4 | 20.1 | 14.0 | 13.2 | 14.6 | 14.5 | 14.0 | 15.2 |
| | Fog on paper [%] | 1.1 | 1.0 | 0.8 | 1.4 | 1.2 | 2.1 | 1.0 | 0.9 | 1.1 | 1.1 | 1.1 | 1.2 |

TABLE 3-2

| | | Example | | | | | | | | | | |
|---|---|---|---|---|---|---|---|---|---|---|---|---|
| | | 13 | 14 | 15 | 16 | 17 | 18 | 19 | 20 | 21 | 22 | 23 |
| Roller No. | | Y-13 | Y-14 | Y-15 | Y-16 | Y-17 | Y-18 | Y-19 | Y-20 | Y-21 | Y-22 | Y-23 |
| Porosity [%] | | 87 | 86 | 87 | 52 | 97 | 45 | 98 | 83 | 87 | 85 | 89 |
| Surface profile | | Surrounded | Surrounded | Surrounded | Surrounded | Surrounded | Surrounded | Surrounded | Surrounded | Not surrounded | Not surrounded | Not surrounded |
| Elastic modulus [MPa] | | 1500 | 1500 | 1900 | 1200 | 1700 | 1100 | 1800 | 2200 | 1500 | 1600 | 1500 |
| Conductive particle exposure ratio | Rs (surface side) [%] | 4.9 | 4.5 | 5.0 | 2.8 | 3.2 | 2.8 | 3.2 | 4.5 | 5.3 | 10.7 | 1.5 |
| | Rt (substrate side) [%] | 5.0 | 4.8 | 4.8 | 2.6 | 3.5 | 2.6 | 3.5 | 4.7 | 5.2 | 10.8 | 1.7 |
| Durability test initial stage | Positive toner ratio [%] | 12.4 | 13.8 | 13.5 | 15.1 | 14.9 | 16.9 | 15.9 | 14.9 | 14.5 | 13.5 | 16.3 |
| | Fog on paper [%] | 0.7 | 0.8 | 0.8 | 1.0 | 1.0 | 1.2 | 1.1 | 0.9 | 0.9 | 0.8 | 1.1 |
| After durability test of 5000 paper sheets | Positive toner ratio [%] | 13.5 | 13.2 | 13.9 | 15.9 | 15.6 | 17.8 | 6.4 | 16.1 | 15.9 | 15.6 | 17.2 |
| | Fog on paper [%] | 0.9 | 0.9 | 1.0 | 1.3 | 1.2 | 1.6 | 1.3 | 1.3 | 1.3 | 1.2 | 1.5 |

TABLE 4

| | | Comparative Example 1 | Comparative Example 2 | Comparative Example 3 | Comparative Example 4 | Comparative Example 5 |
|---|---|---|---|---|---|---|
| Roller No. | | X-1 | X-2 | X-3 | X-4 | X-5 |
| Porosity [%] | | 85 | 90 | 89 | 85 | 85 |
| Surface profile | | Surrounded | Surrounded | Surrounded | Surrounded | Surrounded |
| Elastic modulus [MPa] | | 1500 | 1300 | 1300 | 1500 | 1500 |
| Conductive particle exposure ratio | Rs (surface side) [%] | 0 | 0 | 0 | 0.1 | 3.0 |
| | Rt (substrate side) [%] | 0 | 0 | 0 | 0.1 | 0.1 |
| Durability test initial stage | Positive toner ratio [%] | 19.8 | 12.2 | 19.2 | 18.2 | 17.5 |
| | Fog on paper [%] | 1.7 | 0.6 | 1.5 | 1.4 | 1.3 |
| After durability test of 5000 paper sheets | Positive toner ratio [%] | 27.5 | 25.4 | 26.9 | 26.4 | 23.7 |
| | Fog on paper [%] | 4.0 | 3.2 | 3.7 | 3.6 | 2.8 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-135885, filed Aug. 23, 2023, which is hereby incorporated by reference herein in its entirety.

What is claimed is:

1. An electrophotographic roller, which is a toner supply roller, comprising:

a conductive substrate; and a foamed layer on an outer circumferential surface of the substrate;

the foamed layer being a surface layer of the electrophotographic roller and having a skeleton including a binder resin which is polyurethane, and at least one conductive particle in the binder resin;

the polyurethane being a reaction product of polyol and isocyanate, the polyol comprising polyether polyol and the isocyanate comprising at least one member selected from the group consisting of 2,4-tolylenediisocyanate, 2,6-tolylenediisocyanate and 4,4'-diphenylmethane diisocyanate; and the foamed layer being formed using a temperature-sensitive urethanization catalyst, and having a communication structure with at least one gap opening in an outer surface of the foamed layer, and extending in a thickness direction of the foamed layer, wherein at least a portion of an inner wall of the gap is constituted of the skeleton, at least a portion of the at least one conductive particle is exposed at the inner wall, a thickness T of the foamed layer is 2.0 mm or more, an average elastic modulus measured at a surface of the inner wall is 1300 to 2000 MPa, and with L being a length in the longitudinal direction of the foamed layer, at respective 4 sites rotated by 90 degrees in a circumferential direction of the foamed layer, at each of 3 sites of a midpoint in a longitudinal direction of the foamed layer, and points each at a distance of L/4 from each opposite end toward the midpoint, a cross section with a total thickness of the foamed layer—in a direction along a circumferential direction of the electrophotographic roller is exposed, where for each of the cross sections at a total of 12 sites, the inner wall of the at least one gap present in a region to a depth of 1.0 mm from the outer surface of the foamed layer is observed by a scanning electron microscope, thereby acquiring a secondary electronic image at a magnification of 5000 times, and a resolution of 18 nm/pixel, having 256 gradation steps with the lowest gradation of 0 and the highest gradation of 255, having a contrast of 1200, and an average brightness of 128±16, and in a case where a ratio Rs of a total sum of a number of pixels belonging to brightness of 200 to 255 to a total number of pixels in the secondary electronic image is determined, an average value of Rs at the 12 sites is 0.5% or more, and for each of the cross sections at the total of 12 sites, the inner wall of the at least one gap present in a region to a thickness of 1.0 mm from a surface on a side of the foamed layer opposed to the substrate toward the outer surface of the foamed layer is observed by a scanning electron microscope, thereby acquiring a secondary electronic image at a magnification of 5000 times, and a resolution of 18 nm/pixel, having 256 gradation steps with the lowest gradation of 0 and the highest gradation of 255, having a contrast of 1200, and an average brightness of 128±16, and in a case where a ratio Rt of a total sum of a number of pixels belonging to brightness of 200 to 255 to a total number of pixels in the secondary electronic image is determined, an average value of Rt at the 12 sites is 0.5% or more.

2. The electrophotographic roller according to claim 1, wherein the inner wall of the gap is constituted of the skeleton.

3. The electrophotographic roller according to claim 1 wherein in a case where with an outer circumferential surface of the electrophotographic roller and a first surface that is one surface of a glass plate brought into contact with each other so that an indentation amount of the glass plate with respect to the electrophotographic roller becomes 1.0 mm, a contact portion between the electrophotographic roller and the glass plate is observed from a side of a second surface of the glass plate opposite to the first surface, an edge of the opening surrounds the opening, where the indentation amount is, with the indentation amount in a case, where the glass plate held horizontal has been brought closer from vertically above the electrophotographic roller that is to be observed and the electrophotographic roller and the first surface of the glass plate have come into contact with each other for the first time, assumed to be 0.0 mm, an amount (distance) of the movement of the glass plate therefrom toward the electrophotographic roller.

4. The electrophotographic roller according to claim 1, wherein a content of the conductive particle for every 100 parts by mass of the binder resin included in the foamed layer is 1.0 to 15.0 parts by mass.

5. The electrophotographic roller according to claim 1, wherein the conductive particle includes at least one selected from the group consisting of a conductive metal and carbon black.

6. The electrophotographic roller according to claim 1, wherein the conductive particle includes carbon black.

7. The electrophotographic roller according to claim 1, wherein a porosity of the foamed layer is 50 to 97 vol %.

8. The electrophotographic roller according to claim 1, wherein the porosity of the foamed layer is 82 to 90 vol %.

9. A developing apparatus, comprising:

a development roller; and a toner supply roller for supplying a toner to the development roller, wherein a voltage can be applied between the development roller and the toner supply roller, and the toner supply roller is the electrophotographic roller according to claim 1.

10. An electrophotographic image forming apparatus comprising the developing apparatus according to claim 9.

11. A process cartridge detachable with respect to a main body of an electrophotographic image forming apparatus;

the process cartridge comprising a contact point member that is configured to be electrically connected with an electric contact point of the main body when the process cartridge is mounted on the main body;

the process cartridge comprising a development roller and a toner supply roller for supplying a toner to the development roller; and a voltage being applicable by an electric connection with the main body between the development roller and the toner supply roller, wherein the toner supply roller is the electrophotographic roller according to claim 1.

* * * * *